US007292880B2

(12) United States Patent
Lehtonen (10) Patent No.: US 7,292,880 B2
(45) Date of Patent: Nov. 6, 2007

(54) HANDS-FREE FUNCTION (75) Inventor: Arto Lehtonen, Tampere (FI)

(73) Assignee: Nokia Corporation, Espoo (FI)

( * ) Notice: Subject to any disclaimer, the term of this patent is extended or adjusted under 35 U.S.C. 154(b) by 373 days.

(21) Appl. No.: 09/864,007

(22) Filed: May 23, 2001

(65) Prior Publication Data

US 2001/0049262 A1 Dec. 6, 2001

(30) Foreign Application Priority Data

May 26, 2000 (FI) .................................. 20001274

(51) Int. Cl.
*H04M 1/00* (2006.01)

(52) U.S. Cl. ................. 455/569.1; 455/41.2; 455/41.3; 455/556.1; 455/575.2; 455/344; 381/384

(58) Field of Classification Search ............ 455/556.1, 455/566, 558, 550.1, 575.1, 568.1, 41.3, 455/41.2, 344, 575.2; 381/384
See application file for complete search history.

(56) References Cited

U.S. PATENT DOCUMENTS

| D266,417 S | * | 10/1982 | Perez .......................... D14/165 |
| D306,167 S | * | 2/1990 | Johnson et al. ............. D14/163 |
| 5,551,065 A | * | 8/1996 | Honore ....................... 455/66.1 |
| 5,771,438 A | * | 6/1998 | Palermo et al. ............. 455/41.1 |
| 5,914,941 A | | 6/1999 | Janky .......................... 370/313 |
| 5,978,689 A | | 11/1999 | Tuoriniemi et al. ......... 455/569 |
| 5,983,100 A | | 11/1999 | Johansson et al. .......... 455/426 |
| 6,236,732 B1 | * | 5/2001 | Griffith ........................ 381/370 |
| 6,301,490 B1 | * | 10/2001 | Callan ........................ 455/575.2 |
| 6,366,622 B1 | * | 4/2002 | Brown et al. ................. 375/322 |
| 6,373,942 B1 | * | 4/2002 | Braund ........................ 379/430 |
| 6,396,935 B1 | * | 5/2002 | Makkonen ................... 381/334 |
| 6,430,395 B2 | * | 8/2002 | Arazi et al. ................. 455/41.2 |
| 6,442,375 B1 | * | 8/2002 | Parmentier .................... 455/78 |
| 6,457,024 B1 | * | 9/2002 | Felsentein et al. ............. 345/8 |
| 6,606,506 B1 | * | 8/2003 | Jones .......................... 455/566 |
| 6,683,886 B1 | * | 1/2004 | Tujin et al. .................. 370/458 |
| 6,809,631 B2 | * | 10/2004 | Doi et al. ................... 340/5.86 |

(Continued)

FOREIGN PATENT DOCUMENTS

DE 10005007 A1 * 8/2001

(Continued)

OTHER PUBLICATIONS

Per-Erik Svensson—Bluetooth Usage Models, Bluetooth developers conference, Dec. 6, 1999.*

(Continued)

*Primary Examiner*—Matthew Anderson
*Assistant Examiner*—Sujatha Sharma
(74) *Attorney, Agent, or Firm*—Perman & Green, LLP (57) ABSTRACT

The invention relates to a apparatus for implementing a hands-free function, the apparatus comprising a mobile station (22) and a headset (21). The apparatus comprises means for transferring an audio signal of a call between the mobile station (22) and the headset (21) for hands-free implementation of the call. The mobile station (22) and the headset (21) both comprise a short-range radio transceiver (BT, BT2) for wireless transfer of files between the mobile station (22) and the headset (21). The headset comprises a memory means for storing the files in the headset. The invention also relates to a headset (21).

24 Claims, 5 Drawing Sheets

U.S. PATENT DOCUMENTS

| | | | |
|---|---|---|---|
| 6,901,241 B2 * | 5/2005 | Bjorndahl | 455/41.2 |
| 2001/0025289 A1 * | 9/2001 | Jenkins et al. | 708/141 |
| 2002/0000470 A1 * | 1/2002 | Lanzaro et al. | 235/462.45 |
| 2002/0003889 A1 * | 1/2002 | Fischer | 381/370 |
| 2002/0045454 A1 * | 4/2002 | Iwata | 455/450 |
| 2002/0065099 A1 * | 5/2002 | Bjorndahl | 455/553 |

FOREIGN PATENT DOCUMENTS

| | | |
|---|---|---|
| DE | 1267523 A1 * | 12/2002 |
| EP | 0821257 A3 | 1/1998 |
| EP | 0840465 A2 | 5/1998 |
| EP | 1058480 A2 | 12/2000 |
| JP | 2003219492 A * | 7/2003 |
| WO | WO 99/43136 | 8/1999 |
| WO | WO99/43136 | 8/1999 |
| WO | WO 00/07176 | 2/2000 |
| WO | WO 01/28204 A1 | 4/2001 |

OTHER PUBLICATIONS http://www.bluetooth.com/bluetooth/SIG/Who/History.*

"Cellular Phone with Integrated MP3 Player", Research Disclosure, Kenneth Mason Publications, Hampshire, GB, NR. 418, p. 184, XP000893213 ISSN: 0374-4353.

* cited by examiner

HANDS-FREE FUNCTION

FIELD OF THE INVENTION

The present invention relates to the hands-free function in a mobile station.

BACKGROUND OF THE INVENTION

Several accessories for mobile stations are commercially available for implementing the hands-free function. Ericsson manufactures an accessory HPR-08 for a mobile station. The HPR-08 comprises two earpieces, a microphone and an FM radio module. A cord interconnects the earpieces, the microphone and the FM radio module. The FM radio module can be attached to the bottom connector of certain mobile telephone models (for example Ericsson T10). This allows the radio to be listened to via the earpieces. When a call comes in, the radio is automatically muted, and once the call has been answered (for example by pushing the yes button in the mobile telephone), the earpieces can be used for listening to the call and the microphone for talking.

The accessory HPM-10 for an Ericsson mobile station can also implement the hands-free function. The HPM-10 comprises two stereo earpieces, a microphone and an MP3 audio player. A cord comprising a button for answering a call interconnects the earpieces, the microphone and the MP3 player module. The MP3 player module can be fastened to the bottom connector of certain mobile telephone models (for example Ericsson T10). The MP3 player module is powered by the mobile telephone. This allows music to be listened to by the earpieces from the MP3 audio player. When a call comes in, the MP3 audio player is automatically muted, and the earpieces can be used for listening to the call and the microphone for talking once the call has been answered (for example by pushing the button on the cord).

U.S. Pat. No. 5,978,689 (FIG. 1) discloses an implementation that integrates an audio set and a radiotelephone into the same housing 10. The implementation also comprises earpieces 11, interconnected by a headband 12, and a microphone 13. A cord 14 can be used to connect the housing 10 and the earpiece/microphone combination 11 to 13. For this purpose, the housing 10 comprises a jack 15, with which a plug 16 at the end of the cord 14 mates. With the microphone 13 in an upper position, the earpieces 11 can be used for listening to an audio program from the audio device. When the microphone 13 is moved to a lower position, the earpieces 11 and the microphone 13 can be used for listening to a call and for talking.

SUMMARY OF THE INVENTION

In the present invention, the hands-free function has been developed further. According to a first aspect of the invention there is provided an apparatus for implementing a hands-free function, the apparatus comprising a mobile station and a headset, the apparatus comprising:

means for transferring an audio signal of a call between the mobile station and the headset for hands-free implementation of the call.

The apparatus is characterized in that the mobile station and the headset both comprise:

a short-range radio transceiver for wireless transfer of files between the mobile station and the headset, and that the headset comprises:

a memory means for storing the files.

According to a second aspect of the invention there is provided a headset which comprises means for transferring an audio signal of a call between the headset and a particular mobile station.

The headset is characterized in that the headset comprises:

a short-range radio transceiver for wireless transfer of files between said mobile station and headset, and a memory means for storing the files.

According to the invention, a memory means, for example a memory card slot, into which a memory card is detachably connectable, is disposed in the headset or in connection thereto. Alternatively or in addition, the headset can be provided with fixed memory. The invention enables wireless transfer of files from a terminal over a short-range radio connection to the fixed memory or to the memory card detachably connectable to the memory card slot. For this purpose, the terminal and the headset comprise a short-range radio transceiver, for example an LPRF transceiver (Low Power Radio Frequency). According to an embodiment of the invention, the terminal is a mobile station in a cellular network.

An LPRF connection is a point-to-point connection, in which information, for example data, speech or video image, is transferred over the radio path at low transfer power. Bluetooth technology is an example of standardized technology using an LPRF connection. Herein, a short range refers to a range of about ten meters.

In a preferred embodiment of the invention, said files are user files. User files refer for example to files created, edited or stored by a user. User files may contain for example multimedia, such as multimedia files in the AVI format or audio/video files coded according the MPEG standard or music files, such as MP3 music files. According to an embodiment of the invention, the headset comprises a multimedia player, such as an MP3 player, which decodes the multimedia file stored in the memory means of the headset, such as an MP3 music file. The user has the option to either listen to music decoded by the multimedia player from the earpieces of the headset or, when a call comes in, to listen to the call via the earpieces and speak to the microphone using the hands-free function.

Furthermore, according to an embodiment of the invention, the multimedia player reproduces a multimedia file comprising both image and sound. In this embodiment, the headset comprises, in addition to earpieces, a separate display means, allowing the user to follow the moving image by means of the display means and to listen to the sound via the earpieces.

According to an embodiment of the invention, a headband mechanically interconnects the earpieces comprised by the headset, both of which comprise a speaker. The headband is provided with an electronics module comprising a memory card slot, a short-range radio transceiver and a multimedia player. The user interface of the headset and the multimedia player is introduced to the terminal over an LPRF connection.

An advantage of the invention is that placing a memory card in the headset allows the size of the terminal to be kept small. In addition, when the terminal is a mobile station, the standby time of the terminal can be lengthened according to the invention as compared with a prior art solution, since in the invention, a battery placed in connection with the headset carries out the power supply of the headset independently of the mobile station. Another advantage is that, owing to the LPRF connection, no disturbing cord is required between the headset and the terminal. A further advantage is that a separate, bulky MP3 player module no longer has to be fastened to the terminal, as is the case in prior art solutions, since, according to a preferred embodiment of the invention, the memory card and the multimedia player, such as an MP3 player, are placed in the headset. At the same time, memory is released in the terminal (for example a mobile station/telephone), since the memory card for storing multimedia files is now placed in the headset. Even though the electronics module (comprising for example a memory card slot including electronics) is now placed in the headset or in connection with the headset, the size of the headset does not increase significantly, since the user interface of the headset is placed in the terminal.

BRIEF DESCRIPTION OF THE DRAWINGS

In the following, the invention will be described in greater detail with reference to the attached drawings, in which.

DETAILED DESCRIPTION

Figure 1:
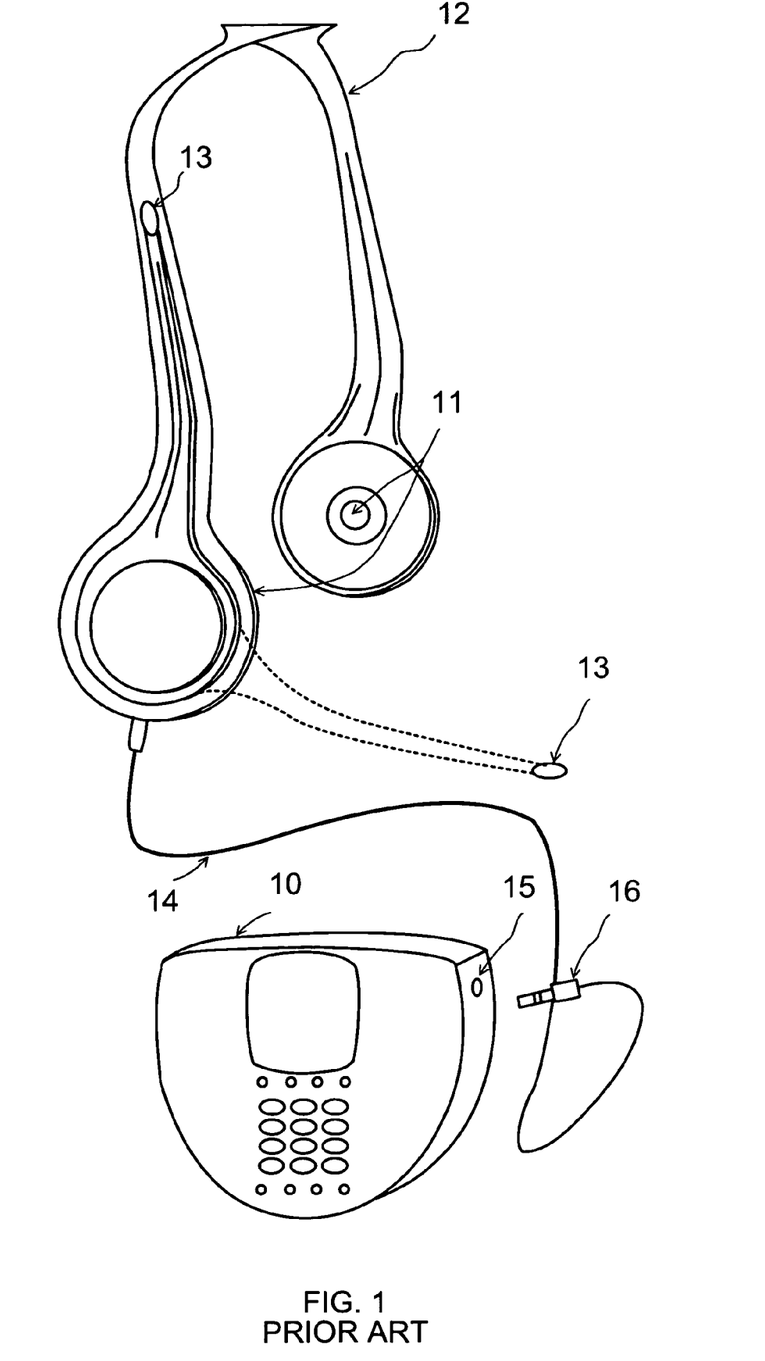
FIG. 1 shows a prior art implementation of the hands-free function.
Figure 2:
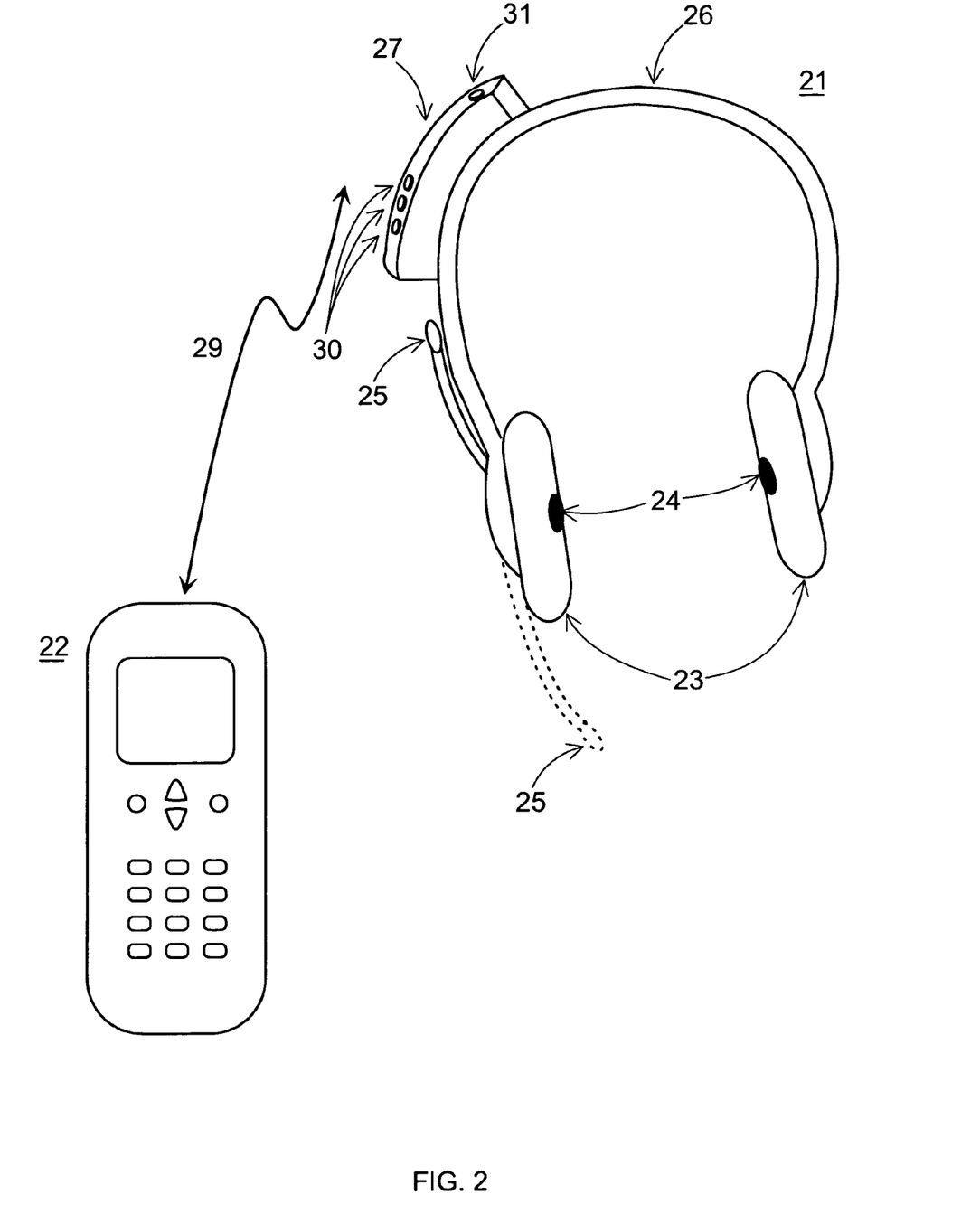
FIG. 2 shows a preferred embodiment of the invention.

FIG. 1 was explained above in connection with prior art. FIG. 2 illustrates a preferred embodiment of the invention. The preferred embodiment of the invention comprises a headset 21 and a mobile telephone 22 in a cellular network.

The headset 21 comprises two stereo earpieces 23 (right and left), each of which comprises a speaker 24 for stereo playback of music. The headset 21 also comprises a microphone 25, a headband 26 and an electronics module 27. The details of the electronics module, which comprises, among other things, a Bluetooth transceiver as a short-range radio transceiver for establishing a Bluetooth connection 29 between the headset 21 and the mobile telephone 22, will be described in greater detail in connection with FIG. 3. The size of the headband 26 is so arranged that, once placed on a person's head, the earpieces 23 are placed over the ears. The electronics module 27 is preferably fastened to the headband 26. For fastening, an appropriate fastening mechanism, such as a sticker or a clincher (not shown in the figure), is used. The electronics module 27, the earpieces 23 and the microphone 25 are electrically interconnected by conductors (not shown in the figure).

Figure 4:
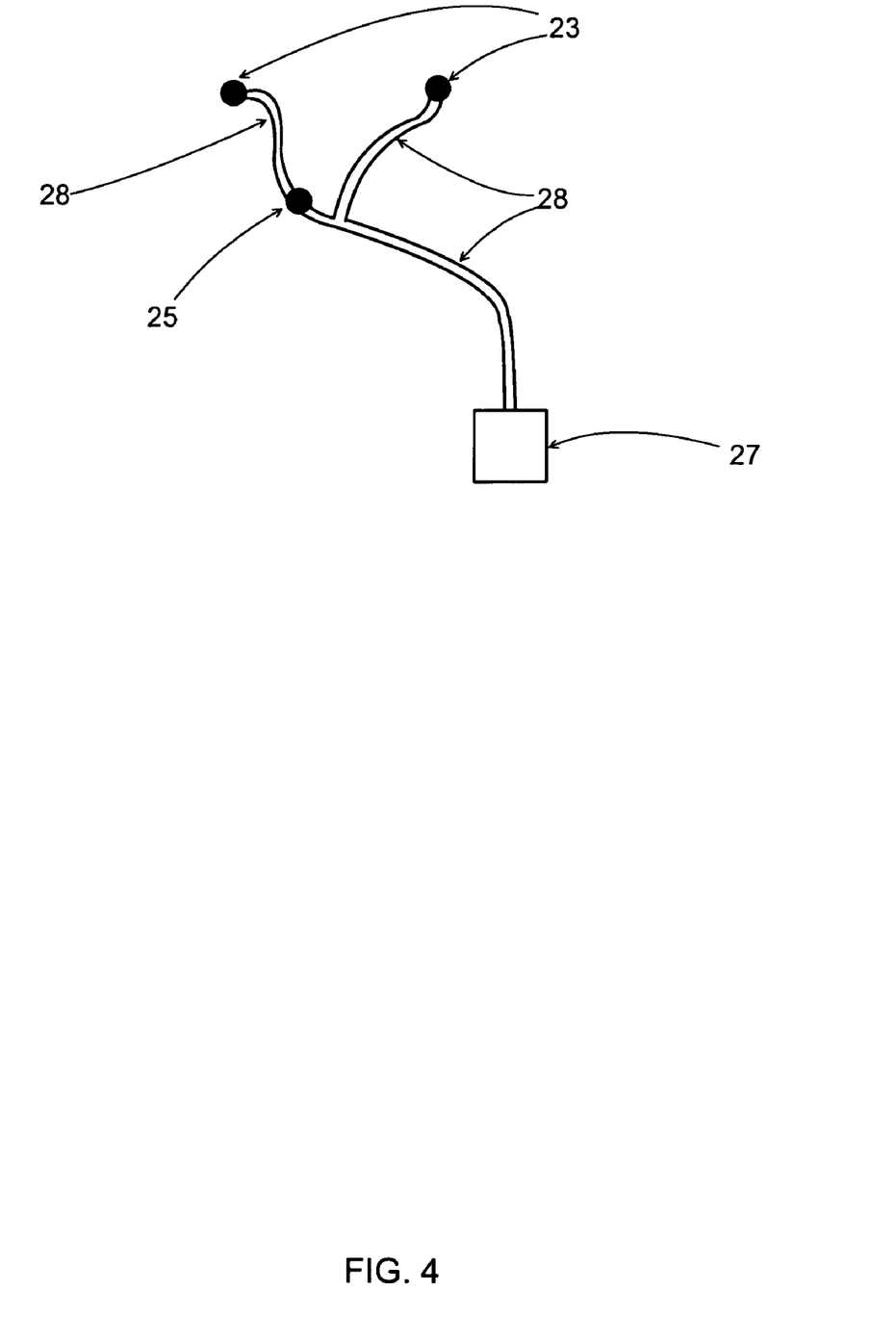
FIG. 4 shows an alternative embodiment of the invention, and FIGS. 5a and 5b schematically show the user interface of a headset on the display of a terminal.

Alternatively (see FIG. 4), if the headband 26 is not used, the earpieces 23 can be made smaller and lighter, and can thus be inserted in the ears. The electronics module 27 of the headset can be arranged as a separate portable module, cords 28 connecting the earpieces of the headset and the electronics module, and the microphone 25 can also be placed on the cord, thus being in its position of use close to a person's mouth or throat. This allows the electronics module 27 to be kept in the user's breast pocket, for example, when the earpieces 23 are in the user's ears. The electronics comprised by the electronics module weigh about 50 to 100 grams, for example.

An alternative is for the headset not to have any microphone. In this case, for example a directional microphone can be placed in the mobile telephone, and the user of the mobile telephone can use this microphone in the hands-free function.

Figure 3:
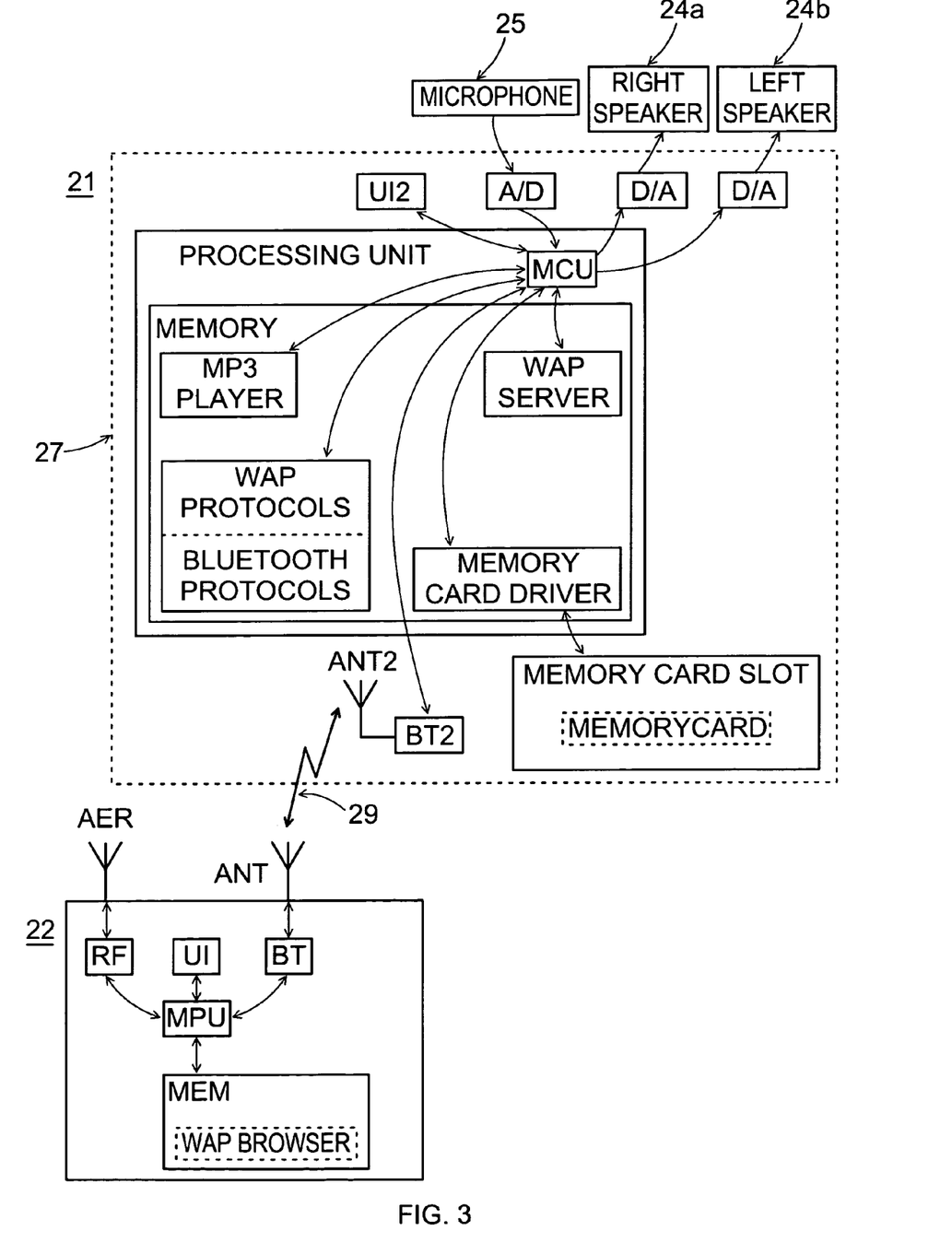
FIG. 3 is a block diagram of the headset and terminal of the invention.

FIG. 3 shows block diagrams of the headset 21 and the mobile telephone 22. The electronics module 27 of the headset comprises a processing unit, which comprises a processor MCU (Master Controlling Unit). This may be a micro controller, microprocessor or DSP circuit (Digital Signal Processor), for example.

The processing unit comprises a memory, which comprises an MP3 player, i.e. an MP3 player application, a WAP server application (Wireless Application Protocol), WAP and Bluetooth protocols, and a memory card driver. The MP3 player application is capable of decoding music files coded in the MP3 format. The WAP server application is used for transferring the user interface of the headset to the mobile telephone. Data transmission between the headset and the mobile telephone is preferably carried out by the WAP and Bluetooth protocols over the Bluetooth connection 29. The memory card driver is a computer program that controls the data transmission to and from the memory card placed in the memory card slot.

The electronics module 26 comprises a Bluetooth transceiver BT2, which is capable of sending and receiving information in accordance with the Bluetooth protocols in the 2.4 GHz frequency range by means of its antenna ANT2. The antenna ANT2 can be an antenna inbuilt in the shell of the electronics module. Alternatively it can be an external antenna. The electronic module also comprises for example a lithium/polymer battery (Li-Pol) as the power source. The battery is not shown in FIG. 3. FIG. 3 also shows the microphone 25 in the headset 21, and an A/D converter for converting an analog audio signal coming from the microphone to the processing unit into digital form. FIG. 3 further shows right and left speakers 24a, 24b in the earpieces 23, and D/A converters for converting a digital audio signal coming from the processing unit to the earpieces 23 into an analog signal.

The headset 21 also comprises a button 31, which is pressed from the headset for answering a call coming to the mobile telephone 22. Alternatively, the headset 21 may comprise a switch for indicating the position of the microphone 25, whereby a call can be answered by turning the microphone 25 from an upper position to a lower position (FIG. 2). U.S. Pat. No. 5,978,689 discloses a similar solution.

Although, according to the invention, the user interface of the headset 21 is introduced to the display of the mobile telephone 22 in a manner to be described later, the headset may also comprise a basic user interface UI2 (FIG. 3), which gives the user an option to use the headset also without the mobile telephone. Said basic user interface UI2 may be implemented by some buttons 30 disposed in the electronics module (FIG. 2) for example for activating and inactivating the playback of music and for manually adjusting the volume level in the earpieces.

The mobile telephone 22 (FIG. 3) comprises a processor MPU and the following parts functionally connected to the processor: a memory MEM, a user interface UI, a radio part RF and a Bluetooth transceiver BT for establishing a Bluetooth connection between the mobile telephone 22 and the headset 21. The processor MPU is preferably a microprocessor, a micro controller or a digital signal processor (DSP). The memory MEM comprises a permanent, non-volatile memory (ROM, read only memory) and a random access memory (RAM). The radio part RF can transmit radio frequency signals, such as speech or other information in a coded form, to a base station in a cellular network, and receive signals from a base station with its antenna AER. The user interface UI provides the user with a display and a keyboard for using the mobile telephone 22. According to the invention, the user interface of the headset 21 is introduced to the user interface UI of the mobile telephone, whereby the mobile telephone is able to control the functions of the headset. The Bluetooth transceiver BT is able to transmit and receive information in the 2.4 GHz frequency range with its antenna ANT in accordance with Bluetooth protocols. The antenna may be an inbuilt antenna. It may alternatively be an external antenna.

The software of the mobile telephone 22 is typically stored in the permanent memory. The processor MPU uses the software to control the operation of the mobile telephone 22, such as the use of the radio part RF and the Bluetooth transceiver BT, the display of information at the user interface UI and the reading of inputs received from the user interface UI. The software comprises WAP and Bluetooth protocols and a WAP browser application, i.e. what is known as a micro browser. The processor MPU uses the RAM as a temporary buffer memory when processing information. The WAP browser application can be used in a known manner for searching for and retrieving files, such as music files, from the Internet.

According to the invention, the user interface of the headset 21 is introduced to the mobile telephone 22. This is preferably accomplished with WAP over Bluetooth technology. The headset comprises a WAP server application and the mobile telephone a WAP browser application. The WAP browser application and the WAP server program communicate over the Bluetooth connection using WAP protocols. Thus the WAP browser program can request that the user interface of the headset be transferred from the headset to the mobile telephone for example as a WML page or pages (Wireless Markup Language). WML Script objects can be combined with WML pages. Alternatively, a special application can be made and used instead of WAP over Bluetooth technology for transferring the user interface of the headset 21 over the Bluetooth connection to the mobile telephone 22.

Figure 5A:
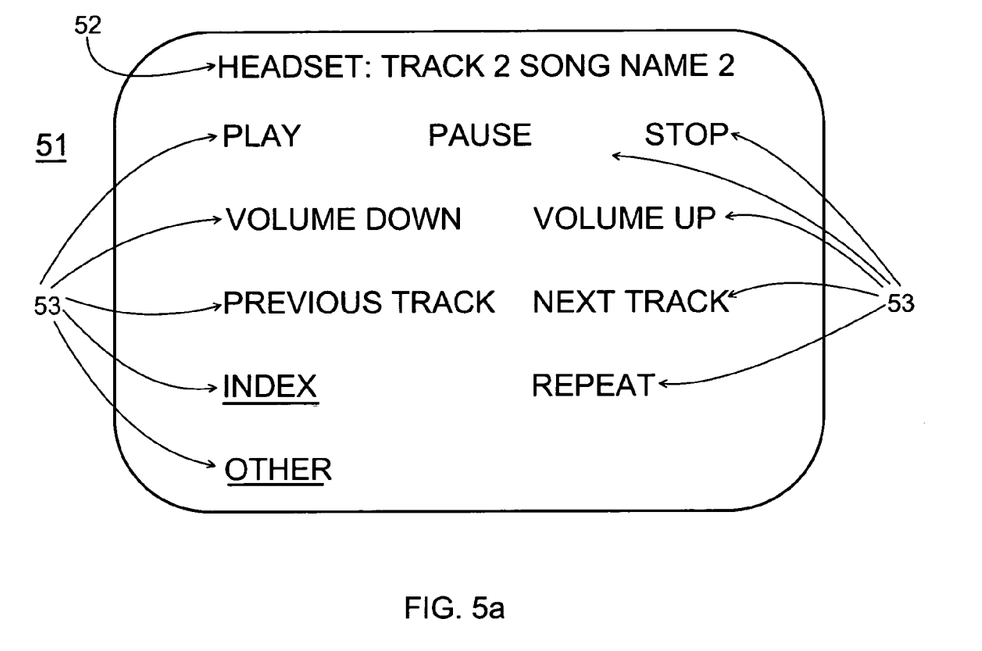
Figure 5B:
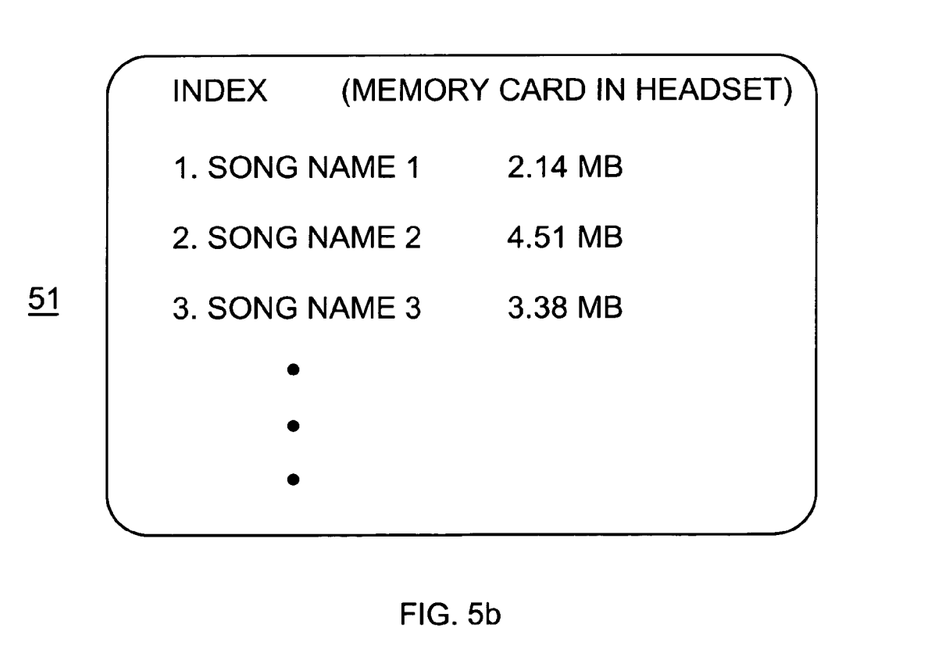

FIGS. 5a and 5b are highly simplified exemplary figures of the user interface of the headset 21 on the display of the mobile telephone 22 as WML pages, i.e. as what is known as a WML deck. FIG. 5a shows a card of the WML deck, i.e. a WML page, on the display 51 of the mobile telephone 22. Displaying information on the display 51 is typically controlled by a part of the software of the mobile telephone 22 called a display controller. The topmost line, i.e. a header line 52, shows the header of the WML page, in the case of FIG. 5a, the word 'HEADSET'. The header line may also show the number of the piece of music to be played, 'TRACK 2' and/or the title of the piece to be played, 'SONG NAME 2'. In addition to the header line 52, several function words 53 are shown to the user. The user may move to the desired function word for example by using the scroll key (not shown in the figure) in the mobile telephone and activate the function by pressing the enter key in the mobile station or some other corresponding selection key (not shown in the figure). In the example of FIG. 5a, the underlining of the function word 53 means that the activation of said function opens a new card from the WML deck on the display of the mobile telephone, i.e. a new WML page, which again shows new functions to be selected. The activation of the PLAY function starts the playback of a music file. The PAUSE function interrupts the playback, and the playback can be resumed with the PLAY function from the point at which the playback was interrupted. The STOP function terminates the playback. The VOLUME DOWN function lowers the volume level of the earpieces. The VOLUME UP function increases the volume level of the earpieces. The PREVIOUS TRACK function initiates the playback from the beginning of the previous piece of music. The NEXT TRACK function initiates the playback from the beginning of the next piece of music. The REPEAT function is used to repeat the same piece. The OTHER function opens a new WML page including more functions, such as functions relating to the tone and balance of sound (not shown in the figure). The INDEX function opens a new WML page, which is illustrated in FIG. 5b.

FIG. 5b illustrates a WML page showing the contents of a memory card inserted in the headset as an index. The index comprises information on the files/pieces of music stored in the memory card. In addition to the name of the file/piece of music 'SONG NAME 1, SONG NAME 2, SONG NAME 3, . . . ', said information may include for example the size of the file/piece of music. In the case of FIG. 5b, the size of the piece of music SONG NAME 1 is 2.14 megabytes, that of SONG NAME 2 4.51 megabytes and that of SONG NAME 3 3.38 megabytes.

Let us next study an embodiment of the invention, which allows the user of the mobile station 22 to use the headset to listen to music and to speak by using the hands-free function. Herein, the use of the invention requires a headset 21 and a mobile telephone 22 of a cellular network. The cellular network may be for example a GSM network (Global System for Mobile Communications), a third generation mobile communication network or some other mobile communication network.

To start with, a memory card is inserted in the memory card slot of the headset 21. The memory card may include pre-stored MP3 music files, which are stored for example by means of a computer. Alternatively, the WAP browser in a mobile telephone can be used to search a communications network, such as the Internet, for MP3 music files to the mobile telephone in accordance with WAP protocols. The MPU can further be used to transfer the MP3 music files via the Bluetooth transceiver in the mobile telephone over the Bluetooth connection to the Bluetooth transceiver in the headset and further by the processing unit via the memory card driver to the memory card slot to the memory card.

The user is now able to start the playback of a piece of music either by activating the PLAY function from the user interface of the headset 21 introduced to the mobile telephone 22 or by pressing button 30 in the basic user interface UI2 in the headset (if the basic user interface is implemented in the headset). The MP3 player application in the headset then starts to decode the MP3 music file and the processing units transfers the decoded data to the D/A converters, which, in turn, convert the data from digital to analog form for the speakers 24a, 24b in the earpieces 23. The speakers 24a, 24b convert the analog signal into sound audible to the user.

Should the user for example wish to adjust the volume level of the earpieces 23 higher, this is accomplished from the mobile telephone 22 by activating the VOLUME UP function. Information on the activation of the VOLUME UP function is transferred from the user interface UI in the mobile telephone via the processor MPU, the Bluetooth transceiver BT and the antenna ANT in accordance with WAP and Bluetooth protocols across the Bluetooth connection 29 to the headset 21. In the headset, the information is conveyed via the antenna ANT2 to the Bluetooth transceiver BT2 and further to the processing unit. When the VOLUME UP function is concerned, the processing unit then adjusts the volume level of the earpieces 23 a step higher. Information on the activation of the other functions (e.g. STOP, PAUSE etc.) is conveyed similarly from the mobile telephone to the headset.

When the user is listening to music and a call is incoming to the mobile telephone 22, the user can answer the call by turning the microphone in the headset from the upper position to the lower position, whereby the playback of music stops. Alternatively, the call can be answered for example by pushing the answer key in the mobile telephone 22.

When the user of the mobile telephone wishes to make a call, he can make the call with the mobile telephone 22. The user can again use the earpieces 23 of the headset for listening to the call and the microphone 25 for talking. As the call is conveyed from the headset to the telephone and further towards a base station of the cellular network, the analog audio signal received by the microphone 25 is converted in the A/D converter into a digital signal, which is transferred to the processing unit of the headset 21. In the processing unit, the processor MCU transfers the digital signal to the Bluetooth transceiver BT2, which sends the signal over the radio path via the antenna ANT2 over the Bluetooth connection 29 to the mobile telephone 22. In the mobile telephone, the signal is received via the antenna ANT to the Bluetooth transceiver BT, from which it is transferred for processing to the MPU and further via the antenna AER in the radio part RF of the mobile telephone to the base station of the cellular network and further to the party receiving the call. When a call propagates in the opposite direction, a digital audio signal is conveyed through said blocks in the opposite order with the exception that, in the headset, instead of to the A/D converters and the microphone, the digital audio signal is conveyed from the processing unit to the D/A converters in which the digital signal is converted into an analog audio signal. The analog signal is conveyed to the speakers 24a, 24b for playback.

The user of the mobile telephone is able to terminate the call for example by lifting the microphone 25 to the upper position, and the playback of music can continue. The playback of music can continue for example automatically from the point when the playback was interrupted as the call came in.

The present MP3 compression makes it possible to store one minute of music in a one-Megabyte memory. Accordingly, for example an 8-Megabyte memory card fits about eight minutes of music, a 16-Megabyte memory card about 16 minutes of music and a 64-Megabyte memory card slightly more than an hour of music.

Alternatively, the MP3 player can be installed in a mobile telephone, in which case a music file, when being played, is first transferred over a Bluetooth connection to the mobile telephone to be decoded by the MP3 player. The decoded audio signal is then sent over the Bluetooth connection to the headset to be listened to by the user.

Alternatively, an FM radio receiver can also be integrated into the headset, giving the user the option to listen to a radio program in addition to listening to the music files on the memory card. An FM radio receiver is lightweight, and can therefore be installed in the headband of the headset together with its basic user interface. The user interface of the FM radio receiver can also be introduced over the Bluetooth connection to the display of the mobile telephone, as can the rest of the user interface of the headset.

In an alternative embodiment of the invention, a multimedia file in the AVI format is transferred over a Bluetooth connection from the mobile telephone 22 to the headset 21. In this embodiment the headset comprises, in addition to earpieces, a separate display means. A multimedia player in the headset decodes said AVI file, allowing the user to follow the image on the display and listen to the sound with the earpieces. The display means may be for example a display, which is fastened to the headset 21 by means of a pivot and which the user can turn in front of the eyes when needed. Alternatively, a wrist TV set can be implemented, onto the display of which the image can be transferred along a cord. Instead of the AVI format, the multimedia file can also be in some other multimedia format, such as MPEG.

Since the physical size of mobile telephones continues to diminish, it is increasingly difficult to integrate memory card slots into a mobile telephone. The size of a commercially available memory card is about 1×25×32 mm, which means that the memory card slot takes up considerably more space in the mobile telephone. According to a preferred embodiment of the invention, at least one memory card slot is placed in the headset instead of the mobile telephone, and therefore space equal to a memory card slot is saved in the mobile telephone. Space is also saved in the mobile telephone because the electronics included in said memory card slot are also placed in the headset.

As was stated in association with an alternative embodiment of the invention, the user can transfer over a Bluetooth connection to storage, not only music files but also other information, such as audio/video files or other multimedia files for which there is no space in the limited memory (e.g. 4 Megabytes) of the mobile station. Said files can be transferred back from the memory card over the Bluetooth connection to the mobile telephone if and when the user needs them in the mobile telephone. The processor MPU of the mobile telephone controls the transfer. The transfer of files from the memory of the mobile telephone to the memory card in the headset releases memory in the mobile telephone.

Alternatively, instead of or in addition to the memory card slot and the memory card, fixed memory can be placed in the electronics module of the headset to be used for music or other files of the user of the mobile telephone.

The implementation and embodiments of the invention are described in the description only by way of example. It is obvious to a person skilled in the art that the invention is not restricted to the details of the above embodiments and that the invention can be implemented also in other forms without deviating from its characteristics. For example the software related to the invention can be implemented in several ways. The headset may also comprise only one earpiece instead of two. The headset may also comprise more than two speakers. The embodiments presented should be considered as illustrative, not restrictive. Hence the optional implementations and uses of the invention are only limited by the attached claims. Consequently, the different alternative embodiments of the invention, including equivalent embodiments, defined by the claims, are within the scope of the invention.

The invention claimed is:

1. An apparatus for implementing a hands-free function, wherein the apparatus comprises:
   a mobile station comprising a first short-range radio transceiver for wireless short-range communication; and
   a headset, separate from the mobile station, the headset comprising a second short-range radio transceiver for wireless short-range communication of files between the mobile station and the headset, and wherein the apparatus is configured to transfer an audio signal of a call between the mobile station and the headset for hands-free implementation of the call, and wherein the headset comprises:
a memory for storing the files; and
a media player, wherein the media player in the headset is arranged to decode the stored files.

2. An apparatus as claimed in claim 1, wherein the headset is arranged to:
receive a particular file from the mobile station with the short-range radio transceiver; and
store said file in the headset.

3. An apparatus as claimed in claim 1, wherein said files are user files.

4. An apparatus as claimed in claim 1, wherein the headset comprises as a memory one of the following: fixed memory, a memory card slot to which a memory card is detachably connectable.

5. An apparatus as claimed in claim 1, wherein the headset comprises a speaker and a microphone.

6. An apparatus as claimed in claim 1, wherein the headset comprises a user interface and that the mobile station is arranged to control the user interface of the headset over a short-range radio connection.

7. An apparatus as claimed in claim 1, wherein the media player comprises a multimedia player.

8. An apparatus as claimed in claim 7, wherein the headset comprises two earpieces and as a multimedia player an audio player, which is arranged to play music in the earpieces.

9. An apparatus as claimed in claim 8, wherein the audio player is arranged to play music by decoding a music file, which is stored in said memory in the headset.

10. An apparatus as claimed in claim 7, wherein the multimedia player comprises a number of functions, and that the mobile station is arranged to control said functions over a short-range radio connection.

11. An apparatus as claimed in claim 1, wherein the mobile station is one of the following: a mobile telephone, a mobile station of a cellular network.

12. An apparatus as claimed in claim 1, wherein said short-range radio connection is a Bluetooth connection.

13. A headset configured for transferring an audio signal of a call between the headset and a particular mobile station, wherein the headset is separate from the mobile station and comprises:
a short-range radio transceiver for wireless short-range transfer of files between the mobile station and the headset,
a memory for storing the files, and
a media player which is arranged to decode the files.

14. A headset as claimed in claim 13, wherein the headset comprises two earpieces interconnected with a headband.

15. A headset as claimed in claim 14, wherein said headband comprises an electronics module comprising said memory and short-range radio transceiver.

16. A headset as claimed in claim 15, wherein said media player comprises a multimedia player.

17. A headset configured for transferring an audio signal of a call between the headset and a particular mobile station, wherein the headset is separate from the mobile station and comprises:
a short-range radio transceiver for wireless short-range transfer of files between the mobile station and the headset,
a memory for storing the files, and
a media player which is arranged to decode the files,
wherein the headset comprises a server application configured for transferring a user interface of the headset to the mobile station.

18. An apparatus for implementing a hands-free function, wherein the apparatus comprises:
a mobile station comprising a first short-range radio transceiver for wireless short-range communication; and
a headset, separate from the mobile station, the headset comDrising a second short-range radio transceiver for wireless short-range communication of files between the mobile station and the headset, and wherein
the apparatus is configured to transfer:
an audio signal of a call between the mobile station and the headset for hands-free implementation of the call, and wherein the headset comprises:
a short range radio transceiver for wireless transfer of files between the mobile station and the headset, and
a memory for storing the files; and
a media player, wherein the media player is the headset is arranged to decode the stored files, and
wherein the headset comprises a server application and the mobile station comprises a client application, and wherein the apparatus is configured to use the server application and the client application to transfer a user interface of the headset to the mobile station.

19. The headset as claimed in claim 17, further comprising a button configured for answering a call received by the mobile station upon activation of the button.

20. The headset as claimed in claim 17, further comprising a microphone comprising a switch configured to indicate a position of the microphone, the headset being configured for answering a call received in the mobile station upon a turning of the microphone.

21. The headset as claimed in claim 17, wherein a headband connecting two earpieces of the headset comprises an electronics module comprising the memory and short range radio transceiver.

22. The apparatus as claimed in claim 18, wherein the headset is configured to:
receive a particular file from the mobile station with the short-range radio transceiver; and
store said file in the headset.

23. The apparatus as claimed in claim 18, wherein the headset comprises as a memory one of the following: fixed memory, a memory card slot to which a memory card is detachably connectable.

24. The apparatus as claimed in claim 18, wherein the headset comprises a user interface and that the mobile station is arranged to control the user interface of the headset over a short-range radio connection.

* * * * *